United States Patent
Fodor et al.

(10) Patent No.: US 6,438,104 B1
(45) Date of Patent: Aug. 20, 2002

(54) LINK-LEVEL FLOW CONTROL METHOD FOR AN ATM SERVER

(75) Inventors: Gabor Fodor, Hässelby (SE); András Rácz, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/131,202

(22) Filed: Aug. 7, 1998

(51) Int. Cl.$^7$ ................................................ H04L 12/56
(52) U.S. Cl. ...................... 370/230; 370/237; 370/395.1; 370/395.41; 370/429; 370/468; 709/234
(58) Field of Search ................................. 370/229, 230, 370/231, 235, 236, 237, 238, 252, 389, 412, 415, 465, 468, 230.1, 395.1, 395.4, 395.41, 428, 429; 709/230, 232, 234, 235, 238, 240

(56) References Cited

U.S. PATENT DOCUMENTS

| | | | |
|---|---|---|---|
| 5,696,764 A | * 12/1997 | Soumiya et al. | 370/395 |
| 5,784,358 A | * 7/1998 | Smith et al. | 370/230 |
| 5,838,681 A | * 11/1998 | Bonomi et al. | 370/395 |
| 6,069,872 A | * 5/2000 | Bonomi et al. | 370/236 |

FOREIGN PATENT DOCUMENTS

EP 0817432 1/1998

OTHER PUBLICATIONS

Kroner et al. "Performance Modelling of An Adaptive CAC Strategy For ATM Networks" Fundamental role of Teletraffic in the Evolution of Telecommunication Networks, Proceedings of the 14$^{th}$ International Teletraffic Congress, Jun. 6–10, 1994, No. 1B, Jun. 6, 1994, pp. 1077–1088.

Rammurthy G. et al. "A Predictive Congestion Control Policy for Braodband Integrated Wide Area Networks" Computer Networks and ISDN Systems, vol. 28, No. 6, Apr. 1, 1996, pp. 811–833.

Mikael Larsson "The Mac Layer Description," The Wireless ATM Research Project Phase 2, Sep. 1997.

Lampros Kalampoukas et al. "Performance of TCP over Multi–Hop ATM Networks: A Comparative Study of ATM–Layer Congestion Control Schemes," UCSC–CRL–95–13, Feb. 16, 1995.

Sally Floyd et al. "Random Early Detection Gateways for Congestion Avoidance," IEEE/ACM Transactions on Networking, Aug. 1993.

Allyn Romanow et al. "Dynamics of TCP Traffic over ATM Networks," IEE Journal on Selected Areas in Communications, May 1995.

* cited by examiner

Primary Examiner—Alpus H. Hsu
(74) Attorney, Agent, or Firm—Burns, Doane, Swecker & Mathis, L.L.P.

(57) ABSTRACT

A link level flow control method for serving ATM cell streams arriving from a number of packet sources determines a requested bandwidth share for each packet source and queues ATM cells arriving from the packet sources in a shared FIFO buffer. Based on the number of transmitted ATM cells during a pre-defined time period, non-violating packet sources and violating packet sources are identified. The non-violating packet sources are those packet sources that during the predefined time period do not require more than their requested bandwidth share, and the violating packet sources are those packet sources that during the same period require more than their requested bandwidth share. In order to maintain fairness among the packet sources, the non-violating packet sources are granted no more than their requested bandwidth share, with the remaining bandwidth not granted to the non-violating packet sources being granted to the violating packet sources.

11 Claims, 3 Drawing Sheets

WFEPD threshold (TH$_1$)

LINK-LEVEL FLOW CONTROL METHOD FOR AN ATM SERVER

Interconnected wide area networks, such as the Internet, use a predefined transport protocol to communicate data packets over network links. Typically, the transported data packets are formatted in accordance with any one of a number of different internet protocols (IPs). For example, since its introduction in the ARPANET in the 1970s, the Transmission Control Protocol (TCP) has become the most widely used transport protocol, due largely to the explosive growth of the TCP/IP Internet in recent years. In addition to TCP, other IPs include the user datagram protocol (UDP) and the real-time transport protocol (RTP) which are used primarily by applications requiring real-time data transfer requirements.

The IP data packets are further formatted in accordance with a point-to-point protocol (PPP) that provides a standard format for multi-protocol data packets over point-to-point links. With the recent popularity of Asynchronous Transfer Mode (ATM), a standard asynchronous-data PPP that offers a wide variety of network services, efforts have been underway to adopt various IP layers over ATM-based networks. The ATM protocol communicates data in fixed size data packets known as ATM cells. Each ATM cell has a singular format comprising a 48 octet payload portion and a 5 octet header portion. Through ATM servers, the ATM cells are routed through packet switches over virtual circuits (VCs) that are set up between endpoints. Using proper scheduling algorithms in the packet switches, the ATM protocol is capable of handling multiple classes of traffic, with each class requiring a corresponding quality-of-services (QOS). For transferring real-time video data, for example, a QOS capable of handling real-time deadlines is required. Another QOS is known as "best effort," which is the type of service employed for transferring data packets in the Internet. For the "best effort" type of QOS, there is no real-time deadline and no guarantees on the available bandwidth, delay, or cell loss rate.

For improving data throughput over network links, some transport layers, such as TCP, include congestion control and recovery algorithms. An important characteristic of TCP congestion control is that it assumes no support from the underlying network and lower layers to indicate or control congestion. Instead, implicit feedback signals such as acknowledgment, timeouts, and duplicate acknowledgments, are used to infer the state of the network. The feedback signals control the amount of traffic injected into the network by modifying the window-size used by a sender.

Although TCP is designed to work in networks with no congestion control mechanism below the transport layer, for various reasons, ATM link-level flow control schemes are used over each VC. For example, one link-level congestion control scheme notifies a packet source directly upon congestion by sending a special ATM cell in reverse direction towards the higher level transport protocol.

Most link-level congestion control schemes buffer the ATM cells arriving at the ATM servers. In wide-area-networks (WANs), where hundreds or thousands of VCs may share the same link, it is customary to share the buffers in order to avoid prohibitive amount of buffering. In such WANs, a conventional link-level congestion control approach is known as ATM Early Packet Discard (ATM-EPD). The ATM-EPD operates on the assumption that once an ATM cell belonging to an IP packet is discarded, all other ATM cells which belong to the same IP packet should be discarded, since the IP packet cannot be reassembled at the destination node. Under the conventional ATM-EPD algorithm, once the buffer occupancy at an ATM switch increases over a pre-defined threshold, the next new IP packet arriving into the buffer is selected and the entire block of constituent ATM cells of that packet are discarded. In this way, the ATM-EPD algorithm effectively prevents fragments of packets from consuming network resources and contributing to further congestion.

Although the conventional EPD algorithm is able to differentiate between the ATM cells of different IP streams that enter a shared buffer, it does not guarantee a predefined share of the available bandwidth amongst different IP packet sources. As a result, in a multi-service network that, for example, supports both TCP and UDP packet sources, the end-to-end TCP congestion control algorithms could decrease sending rate, making more than a fair share of the bandwidth available for the UDP packet sources. In this situation, the UDP packet sources could utilize the bandwidth to the detriment of the TCP packet sources.

In order to provide bandwidth utilization balance among different IP packet sources, it is desirable for the underlying ATM layer to provide a mechanism by which the individual IP sources receive a predefined share of the available bandwidth. This is especially the case in IP/ATM type networks, where certain QOS guarantees should be given to some IP packet sources, while others may be given no guarantee under the best effort QOS. Therefore, there is a need for a simple link-level congestion control method that takes into account fairness amongst various protocols of the IP packet sources, while maximizing link bandwidth utilization and applying corresponding bandwidth guarantees.

SUMMARY OF THE INVENTION

Briefly, the present invention is embodied in a link-level flow control method for an ATM network that receives indications of requested link bandwidth for a plurality of ATM cell streams having corresponding IPs. The received ATM cells are queued in a shared FIFO buffer having a predefined buffer capacity providing specified total link bandwidth to an ATM server. Based on the number of ATM cells queued during a predefined time period, a maximum number of ATM cells to be served for a corresponding internet protocol is determined, with the determined maximum number corresponding to the requested link bandwidth from the plurality of packet sources.

The method of the invention is implemented in the ATM server, which has a FIFO buffer with a predefined buffer size for serving the arriving ATM cells. The ATM server controls the flow of ATM cell streams arriving from a number of packet sources, with each packet source providing cell streams according to one or more of the IPs. Each packet source indicates the requested link bandwidth to the ATM server. Based on the requested link bandwidth, a requested bandwidth share of the total link bandwidth for each packet source is determined. The packet sources that during the pre-defined time period have transmitted ATM cells equal to or below their requested bandwidth share are identified as non-violating packet sources, and those packet sources that during the same time period have transmitted ATM cells in excess of their fair share of the total link bandwidth are identified as violating packet sources. The non-violating sources are granted a share of the link bandwidth that is no more than their requested share of the link bandwidth. The violating packet sources are granted a share of the link bandwidth that is less than their requested share of the link bandwidth, such that the remaining bandwidth share is fully utilized.

According to the some of the more detailed features of the invention, the violating and non-violating packet sources are identified repetitively on a stop-and-go basis at the end of the pre-defined time period. Under another arrangement, the violating and non-violating packet sources are identified on a sliding time window basis, when a congestion condition is indicated during, for example, when the number of arriving ATM cells in the FIFO buffer exceeds a predefined threshold.

According to yet other more detailed features of the present invention, the violating and non-violating sources are identified by ordering the packet sources based on the corresponding number of ATM cells received from them during the predefined period. Then, a total number of overflow ATM cells beyond the server capacity is determined. Based on the total number of overflow ATM cells, the bandwidth granted to the violating packet sources is such that the non-violating sources utilize no more than their required bandwidth. Consequently the violating packet sources utilize all of the remaining bandwidth. In an exemplary embodiment the bandwidth granted to the violating source is shared among them equally. In this way, the present invention provides bandwidth guarantees for individual IP connections, irrespective of the amount of traffic offered by other IP connections sharing the same buffer.

DETAILED DESCRIPTION OF THE PREFERRED EMBODIMENT OF THE PRESENT INVENTION

Figure 1:
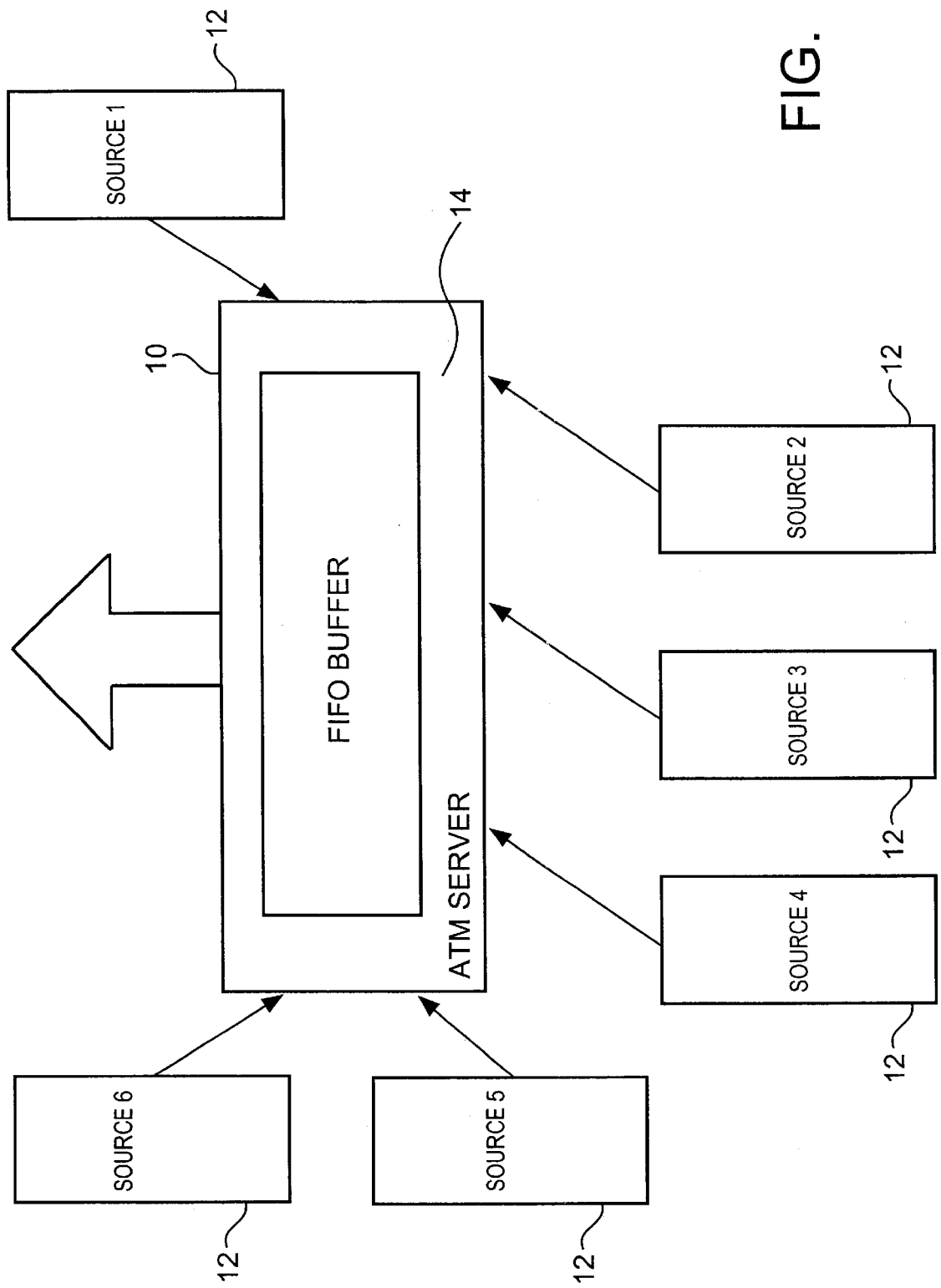
FIG. 1 is a block diagram of an ATM server incorporating a link-level flow control method according to the present invention.

Referring to FIG. 1, an ATM server 10 which is used in virtual circuits of a multi-service ATM network is shown. Over corresponding links, the ATM server 10 receives ATM cells representing date packets from a number (N) of different IP packet sources 12. In a well known manner, the data packets are formatted according to a corresponding Internet Protocol (IP), such as TCP or UDP, with each IP producing a corresponding IP stream of ATM cells. For the sake of simplicity in describing the present invention, it is assumed the each IP packet source 12 generates an IP steam under only one protocol, for example, either a TCP stream or a UDP stream. It should be noted, however, that the present invention is equally applicable in cases where each IP packet source is capable of offering a mix of various IP streams, for example, a combination of TCP and UDP streams. The ATM server 10 includes a shared FIFO buffer 14 with a specified capacity for buffering a number of (R) ATM cells per second. Therefore, during a time period T, the ATM server 10 has a maximum capacity for scheduling and serving a total of R*T cells from all of the IP packet sources 12.

Figure 2:
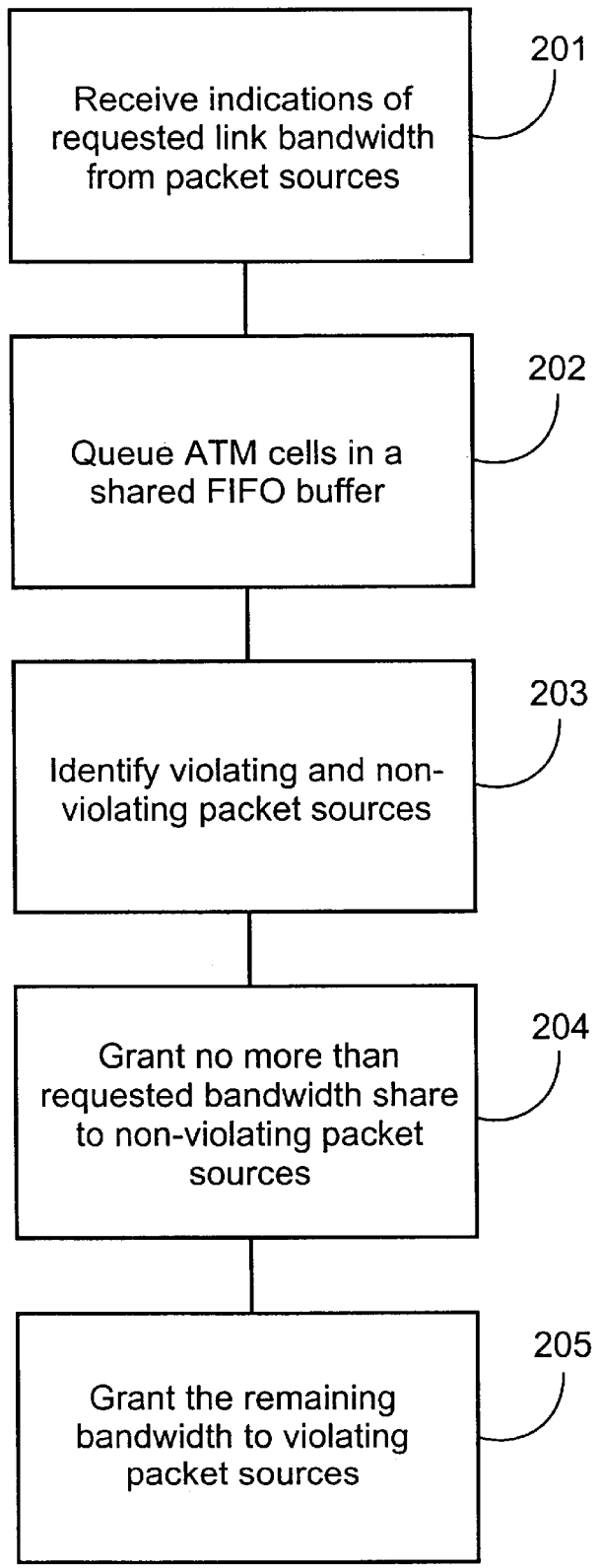
FIG. 2 is a flow chart diagram of a link-level flow control method according to the present invention.

Referring to FIG. 2, a flow chart of the link-level flow control of the present invention depicts the steps taken to provide fair share of the link bandwidth to each IP stream, irrespective of the transport layer used for transporting the ATM cells. First, indications of requested bandwidth share for ATM cell streams arriving at the FIFO buffer with corresponding internet protocols is received, lock 201. The arriving ATM cells are queued in the FIFO buffer, block 202. Based on the indications of the requested bandwidth share, the ATM server identify a number of packet sources as non violating packet sources, block 203. The ATM server serves a maximum number of ATM cells of the non-violating packet sources, thereby granting them no more than their requested bandwith share, block 204. The ATM server 10 identifies a an overflow number of ATM cells of the violating packet sources that are not served, thereby granting the remaining bandwidth to the violating packet sources, block 205.

In the present invention, the fair bandwidth share corresponds to a requested bandwidth share ($L_i$), which is received from each one of the packet sources 12. In its simplest form, each packet source 12 may specify its requested bandwidth share ($L_i$) as a number of cells, $n_i$, to be transmitted or offered by the packet source during the time period T, with the total number ATM cells being equal to:

$$\sum_{i=1}^{N} n_i$$

As described in detail below, the ATM server 10, which includes a storage area 16 for maintaining a record of the requested bandwidth share for each packet source, executes a Weighted Fair Early Packet Discard (WFEPD) algorithm according to the present invention. For each packet source the WFEPD algorithm assigns a requested bandwidth share $\alpha_i$ such that the requested bandwidth share ($\alpha_i > 0$) assigned to all of the IP sources satisfies the following the relationship:

$$\sum_{i=1}^{N} \alpha_i = 1.$$

The WFEPD assumes that the requested bandwidth share $\alpha_i$ is known by the time an IP session over an ATM virtual circuit is established. Under one arrangement, an IP session may use ATM signaling to indicate its bandwidth requirement. If the network can provide the bandwidth, the session is established. Otherwise the session is rejected. Under another arrangement, the ATM server 10 is preconfigured via a management table to give certain users a certain share of the bandwidth. The network operator can configure these tables, for example, in accordance with a subscription contract.

Based on the requested bandwidth share of each IP stream, the WFEPD algorithm then determines whether a packet source 12 is a violating packet source or a non-violating packet source. A packet source 12 is regarded as a violating packet source, if it offers more ATM cells than its requested bandwidth share. According to the present invention, the ATM server 10 serves all of the offered ATM cells of the non-violating packet sources, giving them maximum bandwidth not beyond their requested bandwidth share. With respect to the violating packet sources, the ATM server 10 serves as many as their offered ATM cells, discarding as little overflow ATM cells as possible. Consequently, when a congestion situation arises, the present invention achieves a high bandwidth utilization by giving the non-violating packet sources no more than their requested bandwidth share while giving the violating sources as much bandwidth as possible, although less than their requested bandwidth. In the preferred embodiment of the present invention, the discarded ATM cells of a violating packet source may result in entire packet discards under the conventional EPD scheme.

In one aspect of the present invention, the WFEPD algorithm is implemented using a Stop-And-Go (SAG) scheme that waits for the time period T, after which the violating packet sources are identified. Under the SAG implementation, the bandwidth to be granted to each packet source 12 is determined at the end of the time period T. After the time period T, during which the ATM server 10 queues the arriving ATM cells in the FIFO buffer 14, a granted bandwidth for each packet source 12 is determined based on its requested bandwidth share ($\alpha_i$). In another aspect of the present invention, the WFEPD algorithm is implemented using a sliding window (SLW) scheme for identifying the violating packet sources only after a congestion condition is indicated, when the FIFO buffer 14 is about to overflow. The SLW implementation keeps track of the number of arriving ATM cells, $n_i(t)$ during an immediately preceding sliding time window, with the sliding time window corresponding to a time window of [t–T, t]. In the preferred embodiment of the invention, the congestion condition is indicated at any time t that the FIFO buffer occupancy exceeds a predefined buffer overflow threshold ($TH_1$). Thus, the main difference between the SAG and SLW implementations is that the former repetitively identifies violating packet sources at the end of each time period T, and the latter determines the violating packet sources during a last time period T after which the FIFO buffer is overflown.

Figure 3:
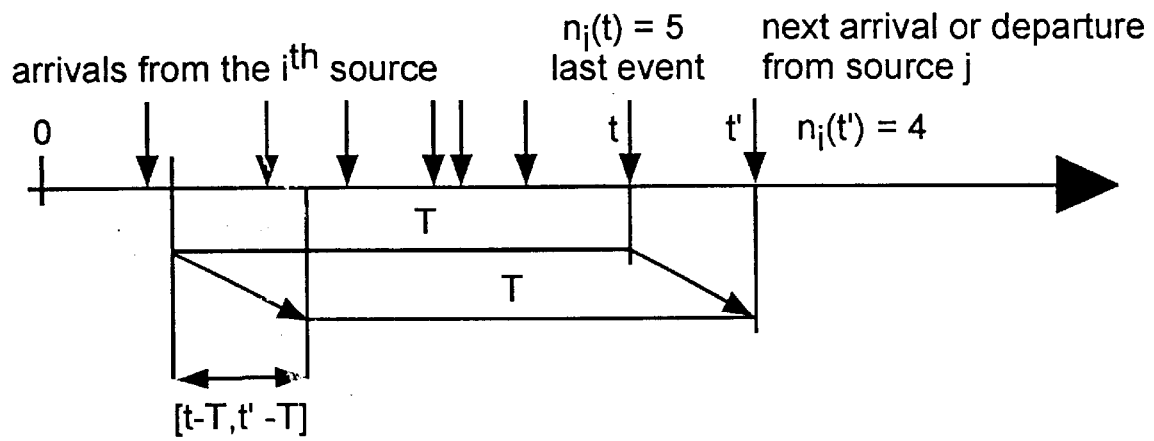
FIG. 3 is a timing diagram depicting the arrival of cells under a sliding time window implementation of the method shown in FIG. 2.

Referring to FIG. 3, under the SLW implementation, the number of buffered ATM cells from a packet source 12, at any given time t, $n_i(t)$, corresponds to the number of arriving ATM cells during the last period of length T. Assuming that a new cell arrives at the $j^{th}$ packet source at time t' and that last arrival happened at time t<t', the counter of the $j^{th}$ packet source ($n_j$) is incremented by one for an arriving ATM cell (or decremented by one for a departing ATM cell). The SLW implementation shifts the T window forward by the time that has elapsed from a last cell arrival or departure event [t'–t]. For every value of i, an $n_i$ counter is decrement by the number of cells that the ATM server 10 serves for the $i^{th}$ packet source in the interval of [t–T, t'–T]. In another embodiment of the SLW implementation, instead of continuously updating the $n_i$ counters at every departure, the counters are updated at regular time intervals of $\Delta$, where $\Delta$ can, for example, correspond to a cell transmission time. Thereafter, based on a congestion condition indicated by the $n_i$ counters exceeding the over flow threshold ($TH_1$), the violating and non-violating packet sources are identified.

For identifying the violating and non-violating sources, both the SLW and SAG implementations order the packet sources 12 according to the number of ATM cells received for each one of the IP streams, with such ordering satisfying Equation (1):

$$\text{Stream}_1 > \text{Stream}_2 > \ldots > \text{Stream}_N, \quad (1)$$

if and only if:

$$n_1/\alpha_1 >= n_2/\alpha_2 >= \ldots >= n_N/\alpha_N.$$

As described above, for the SAG implementation, the WFEPD algorithm orders the packet sources at the end of the time period T. In the SLW implementation, every incoming ATM cell is accepted and served, as long as the FIFO buffer 14 occupancy is below the overflow threshold ($TH_1$). When the threshold $TH_1$ is exceeded, the violating packet sources are identified based on the record of the last time period T.

In the preferred embodiment, before identifying the violating packet sources, the WFEPD algorithm first determines the number of overflow cells ($\psi_T$), according to Equation (2):

$$\psi_T := \sum_{i=1}^{N} n_i - R*T \quad (2)$$

As such, the number of overflow cells correspond to the number of ATM cells that are offered by all of the packet sources 12, beyond the total capacity of the ATM server 10. If greater than 0, the $\psi_T$ value indicates the number of ATM cells that the ATM server 10 would not serve.

Then, the WFEPD algorithm identifies the violating and non-violating packet sources. The first non-violating packet source, denoted as $\omega_{min}$, is identified by finding the smallest value that satisfies Equation (3):

$$n_\omega \leq \left( \sum_{i=1}^{\omega} n_i - \psi_T \right) * \frac{\alpha_\omega}{\sum_{i=1}^{\omega} \alpha_i} \quad (3)$$

Once, the first non-violating packet source is identified, the WFEPD algorithm designates the packet sources $\omega_{min}$ thru the packet source N as non-violating packet sources. Consequently, the packet sources 1 thru $\omega_{min}-1$ are designated as violating packet sources based on such identification thereafter, the total bandwidth for the violating packet sources is determined according to Equation (4):

$$R^{(v)} * T = R*T - \sum_{i=\omega+1}^{N} n_i \quad (4)$$

$$= \sum_{i=1}^{\omega} n_i + \sum_{i=\omega+1}^{N} n_i - \psi_T - \sum_{i=\omega+1}^{N} n_i$$

$$= \sum_{i=1}^{\omega} n_i - \psi_T$$

In the preferred embodiment of the invention, the WFEPD algorithm divides the total available bandwidth among the violating packet sources weighted by the $\alpha_i$ weights according to Equation (5): Under Equation (5), the bandwidth is equally divided only when the requested bandwidth shares are equal, for example, when two sources require half of the bandwidth (50%—50%). However, when the requested bandwidth shares are not equal, for example, when one source requires ⅓ of the bandwidth and the other requires ⅔ of the bandwidth, the bandwidth is divided in a weighted manner (in this example it would be 33.3% and 66.6%).

$$n_i^{(sch)} = R^{(v)} * T * \frac{\alpha_i}{\sum_{i=1}^{\omega} \alpha_i} < n_i \quad i = 1, \ldots, \omega \quad (5)$$

where $n_i^{(sch)}$ denotes the number of ATM cells that the ATM server 10 would schedule and serve for a violating packet source i. In this way, the ATM server 10 gives the violating packet sources 1 thru $\omega_{min}-1$ some of the available bandwidth based on the number of ATM cells overflown, according to Equation (6).

$$n_i^{(sch)} = \frac{\alpha_i}{\sum_{i=1}^{\omega_{min}-1} \alpha_i} * \left( \sum_{j=1}^{\omega_{min}-1} n_j - \psi_T \right)$$

The rest of the packet sources ($\omega_{min}, \ldots, N$) receive their requested bandwidth share. In this way, the WFEPD algorithm assures that the violating packet sources, among themselves, get some bandwidth share, and the non-violating packet sources do not receive higher bandwidth than they requested.

The following examples present three exemplary situations under which the method of the present invention controls the flow of ATM cells over the links. In order to describe the exemplary situations, it is assumed that the ATM server 10 has a total capacity of R*T=100 for serving ATM cells from six packet sources, i.e., N=6. For all of the exemplary situations, it is assumed that during the period T, the six packet sources have offered the following number of ATM cells:

Packet source 1 offering $n_1$=30 ATM cells;
Packet source 2 offering $n_2$=30 ATM cells;
Packet source 3 offering $n_3$=30 ATM cells;
Packet source 4 offering $n_4$=20 ATM cells;
Packet source 5 offering $n_5$=15 ATM cells; and
Packet source 6 offering $n_6$=5 ATM cells.

In the first exemplary situation, it is assumed that all six packet sources, require an equal share of the total bandwidth, $\alpha_i$=1/6. When the WFEPD algorithm sorts the packet sources according to Equation 1, the packet sources are ordered in an ascending order, with Packet sources 6 having the least number of offered cells and Packet source 1 having the highest number of offered ATM cells. Therefore:

For i=1, Packet source 1 has a corresponding $n_1/\alpha 1$ ratio of 180;
For i=2, Packet source 2 has a corresponding $n_2/\alpha 2$ ratio of 180;
For i=3, Packet source 3 has a corresponding $n_3/\alpha 3$ ratio of 180;
For i=4, Packet source 4 has a corresponding $n_4/\alpha_4$ ratio of 120;
For i=5, Packet source 5 has a corresponding $n_5/\alpha_5$ ratio of 90; and
For i=6, Packet source 6 has a corresponding $n_6/\alpha_6$ ratio of 15.

Based on $\alpha_i$=1/6, $\Sigma n_i$=130, and R*T=100, the number of overflow cells under Equation (3) is $\psi_T$=30. Under Equation (4), the WFEPD algorithm determines the smallest $\omega_{min}$ that satisfies Equation (4). Under this exemplary situation, the smallest $\omega_{min}$ is equal to 4, because:

$$\omega = 4: n_w + 1 = 20 \leq \left( \sum_{i=1}^{4} n_i - \psi_T \right) * \frac{\alpha_4}{\sum_{i=1}^{4} \alpha_i} = 20 \quad (6)$$

Thus, Packet source 1, Packet source 2, and Packet source 3 ($\omega_{min}$-1 packet source) are selected as violating packet sources. For i=1, . . . , 3, the total bandwidth of the violating sources is $R^{(v)}*T$=90−30=60 ATM cells, which is divided equally giving $n_i^{(sch)}$=1/3*(60)=20 ATM cells to each violating packet source. As a result, the WFEPD algorithm discards 10 out of 30 offered ATM cells from the violating packet sources (i.e., Packet source 1, Packet source 2, and Packet source 3.)

It should be noted that discarding the ATM cells from only one packet source that offers 30 cells may deem to be better than dropping 10 ATM cells from 3 packet as illustrated in this particular exemplary situation. However, because the packet sizes of the IP streams are unknown, especially in the case of UDP as well as TCP, the WFEPD algorithm is designed to provide a fair amount of bandwidth in the long run regardless of the protocol of an IP stream. Thus, at times of congestion, UDP streams do not usurp the bandwidth at the expense of the TCP streams. From the above example, it should be noted that the overflow bandwidth is reduced only by an amount that is beyond the ATM server's total capacity.

In another exemplary illustration, it is assumed that the packet sources have non-equal requested bandwidth shares as follows:

Packet source 1 has a requested bandwidth share of $\alpha_1$=0.25;
Packet source 2 has a requested bandwidth share of $\alpha_2$=0.20;
Packet source 3 has a requested bandwidth share of $\alpha_3$=0.15;
Packet source 4 has a requested bandwidth share of $\alpha_4$=0.10;
Packet source 5 has a requested bandwidth share of $\alpha_5$=0.20; and
Packet source 6 has a requested bandwidth share of $\alpha_6$=0.10.

Under Equation (1), based on their respective $n_i/\alpha_i$ values, the packet sources are ordered as follows:

For i=1, Packet source 3 has a corresponding $n_1/\alpha_1$ ratio of 200;
For i=2, Packet source 4 has a corresponding $n_2/\alpha_2$ ratio of 200;
For i=3, Packet source 2 has a corresponding $n_3/\alpha_3$ ratio of 150;
For i=4, Packet source 1 has a corresponding $n_4/\alpha_4$ ratio of 120;
For i=5, Packet source 5 has a corresponding $n_5/\alpha_5$ ratio of 75; and
For i=6, Packet source 6 has a corresponding $n_6/\alpha_6$ ratio of 50.

According to the WFEPD algorithm, the $\omega_{min}$ that satisfies Equation (4) is equal to 5, because:

$$\omega = 5: n_\omega = 15 \leq \left( \sum_{i=1}^{5} n_i - \psi_T \right) * \frac{\alpha_5}{\sum_{i=1}^{5} \alpha_i} = 21.11$$

Thus, the number of scheduled cells in this case for the first four packet sources are given by the following relationship:

$$n_1^{(sch)}=17.14, n_2^{(sch)}=11.422, n_3^{(sch)}=22.85, n_4^{(sch)}=28.57.$$

That is, $$\sum_{i=1}^{4} n_i^{(sch)} = 80,$$

and the ATM server 10 serves all of the ATM cells of the last two ordered Packet sources, i.e., Packet source 5 and Packet source 6, offering 20 ATM cells combined. In the last example, the WFEPD algorithm selects all packet sources that exceed their respective allocated bandwidth share ($\alpha_i*R*T$) as violating. Under the WFEPD algorithm, however, a packet source 12 may exceed its allocated bandwidth share ($\alpha_i*R*T$), but still not be selected as a violating packet source, provided that the other packet sources do not utilize their requested bandwidth. The following exemplary situation illustrates the case when a packet source receives all of its needed bandwidth, even when it offers cells that are beyond its requested bandwidth. In order to illustrate this situation, it is assumed that the packet sources have the following requested bandwidth share:

Packet source 1 has a share of $\alpha_1=0.01$;
Packet source 2 has a share of $\alpha_2=0.4$;
Packet source 3 has a share of $\alpha_3=0.4$;
Packet source 4 has a share of $\alpha_4=0.10$;
Packet source 5 has a share of $\alpha_5=0.05$ and
Packet source 4 has a share of $\alpha_6=0.04$ Based on Equations (1)–(6), WFEPD algorithm selects Packet source 1 and Packet source 5 as violating packet sources. Despite the fact that Packet source 4 and Packet source 6 both have offered more ATM cells than their requested bandwidth shares, the WFEPD algorithm does not select these packet sources as violating packet sources, serving of all of their offered ATM cells.

As explained above, the present invention discards the least amount of over flown ATM cells belonging to the violating packet sources. In the SLW implementation, at times the FIFO buffer occupancy may drop below the $TH_1$ threshold, when a violating packet source starts sending an entire IP packet. Then, the threshold may exceed before the packet source finishes the transmission of all of the ATM cells of the IP packet. According to the conventional EPD algorithm, however, the FIFO buffer must accept all of the ATM cells of an already started IP packet even if it belongs to a violating packet source. In that situation, as soon as the buffer occupancy drops below the threshold, WFEPD stops discarding cells. Preferably, in the SLW implementation, the ATM cells of non-violating packet sources are accepted, even when the buffer occupancy is above the threshold.

As explained above, under the SLW implementation there is no need to buffer the ATM cells during distinct time periods of T, since the record of offered cells is continuously updated such that the last T period is taken into account on a sliding time window basis. Furthermore, the ATM server 10 is unaware of the number of arriving ATM cells beyond the time period T during which a maximum of R*T ATM cells can be served. In case of burst data packet sources, it is advantageous, to buffer, rather than discard, the ATM cells that are sent over the capacity R*T during any time period T. Therefore, under one aspect of the preferred embodiment of the SLW implementation, the FIFO buffer is divided into two buffers: a high buffer having a buffer size of $b_h$ and a low buffer having a buffer size of $b_l$, with the total FIFO buffer size B being equal to $b_h+b_l$.

Figure 4:
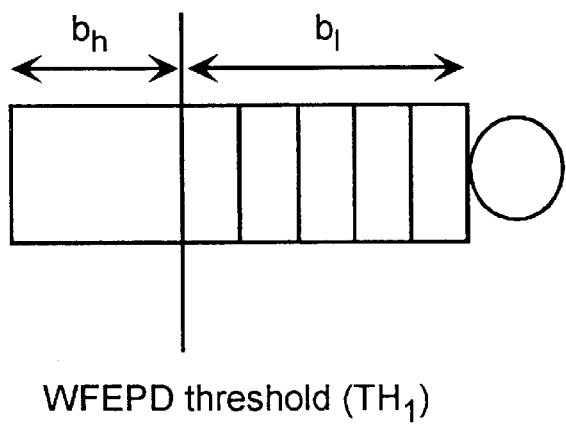
FIG. 4 is a buffer sizing diagram for a FIFO buffer incorporated in the ATM server of FIG. 1.

As shown in FIG. 4, the threshold ($TH_1$) is set to be equal to $b_l$ such that if the WFEPD algorithm is triggered upon detection of a congestion condition, i.e., when the threshold TH is exceeded, the ATM cells of the non-violating packet sources do not get discarded due to buffer overflow. As such, depending on the offered traffic and QOS requirements of the network, the size of the low buffer ($b_l$) is designed to absorb aggregated traffic independent of the operation of the WFEPD algorithm. The high buffer size ($b_h$) is dimensioned such that it insures fairness even in the worst case situation, when all packet sources offer their respective maximal number of cells. In this situation, all the ATM cells are admitted into the high buffer, even when all packet sources send cells in a simultaneous burst.

Buffer dimensioning of this aspect of the present invention, therefore, takes into account the maximum number of ATM cells that can be offered simultaneously, without violating the individual shares of each IP stream. As a result, when none of the packet sources transmit ATM cells during a previous time period T, instead all of the packet sources transmit their exact requested share ($\alpha_i*R*T$) during a next time period T, the high buffer is dimensioned to accept at least $$\sum_{i=1}^{N} \alpha_i * R * T = R * T$$

cells in addition to those that might already be in the buffer. When the WFEPD algorithm is triggered, i.e., when the FIFO buffer occupancy exceeds the threshold, the high buffer size $b_h$ should be dimensioned to accept at least a number of cells equal to the R*T capacity. When none of the packet sources has sent any cells during the previous T period, the maximum number of cells that can be in the FIFO buffer at the arrival of the bursts is $S_{max}$=B−R*T. Thus, the high buffer would have at least R*T free space, provided that B>=R*T. Therefore, the buffer size $b_h$ is selected to be greater than or equal to R*T, i.e., $b_h$>=R*T, with the total buffer size B being greater than or equal to R*T+bi.

Since even violating packet sources can send cells up to the length of an IP packet due to the EPD mechanism, even if the buffer occupancy is above TH, the maximum length of an IP packet expressed in terms of ATM cells multiplied by the number of flows should be added to the above calculated buffer size.

It has been observed that cell throughput of the ATM server 10 is related to how often WFEPD algorithm is triggered, with the triggering frequency being more frequent by if the chosen time period T is too short and/or a selected buffer size is too large.

From the forgoing description, it would be appreciated that the present invention offers a simple algorithm applicable for determining the allocated bandwidth for IP streams carried over ATM VCs. The algorithm guarantees long term fairness independently of the upper layer protocol (i.e. TCP or UDP), which can be used together with the conventional EPD mechanism to provide high bandwidth utilization.

What is claimed is:

1. A link-level flow control method for serving ATM cell streams arriving from a number of packet sources comprising the steps of:

determining a requested bandwidth share for each packet source;

queuing ATM cells arriving from the packet sources in a shared FIFO buffer;

identifying non-violating packet sources and violating packet sources based on the number of transmitted ATM cells during a pre-defined time period, with the non-violating packet sources being the packet sources that during the predefined time period do not require more than their requested bandwidth share, and violating packet sources being the packet sources that during the same period require more than their requested bandwidth share;

granting no more than their requested bandwidth share to the non-violating packet sources; and granting a remaining bandwidth not granted to the non-violating packet sources to the violating packet sources.

2. The method of claim 1, wherein the violating and non-violating packet sources are identified repetitively at the end of a time period.

3. The method of claim 1, wherein the violating and non-violating packet sources are identified, when a congestion condition is indicated during an immediately preceding time period.

4. The method of claim 3, wherein the congestion condition is indicated when the number of arriving ATM cells in the shared FIFO buffer exceeds a predefined threshold.

5. The method of claim 1, wherein the step of identifying violating and non-violating packet sources comprises the step of:

ordering the packet sources based on the number of ATM cells received from them during the predefined period and their corresponding fair share of the link bandwidth;

determining a number of overflow ATM cells received beyond the total link bandwidth;

based on the number of overflow ATM cells, determining the bandwidth for the violating and non-violating sources.

6. The method of claim 5 further including the step of sharing the total bandwidth of the violating source among them based on their requested bandwidth share.

7. The method of claim 1 further including the step of serving the ATM cells of the non-violating packet sources at the end of the predefined time period.

8. The method of claim 5 further including the step of identifying a minimum number of overflow ATM cells of the violating sources that are not served at the end of the predefined time period.

9. The method of claim 8 further including the step of discarding the minimum number of overflow ATM cells.

10. The method of claim 9, further including the step of identifying a minimum number of overflow ATM cells when a congestion condition is indicated during the immediately preceding time period.

11. The method of claim 10 further including the step of discarding the minimum number of overflow ATM cells.

* * * * *